United States Patent [19]

Barabash et al.

[11] Patent Number: 5,293,620
[45] Date of Patent: Mar. 8, 1994

[54] METHOD APPARATUS FOR SCHEDULING TASKS IN REPEATED ITERATIONS IN A DIGITAL DATA PROCESSING SYSTEM HAVING MULTIPLE PROCESSORS

[75] Inventors: William Barabash, Acton; William S. Yerazunis, Hudson, both of Mass.

[73] Assignee: Digital Equipment Corporation, Maynard, Mass.

[21] Appl. No.: 927,785

[22] Filed: Aug. 10, 1992

Related U.S. Application Data

[63] Continuation of Ser. No. 366,774, Jun. 13, 1989, abandoned.

[51] Int. Cl.$^5$ ............................................. G06F 9/40
[52] U.S. Cl. ............................ 395/650; 364/DIG. 1; 364/230.3; 364/254.5; 364/262.1; 364/264.6; 364/281.3; 364/281.8
[58] Field of Search ........................................... 395/650

[56] References Cited

U.S. PATENT DOCUMENTS

| | | |
|---|---|---|
| 4,229,790 | 10/1980 | Gillilard et al. .................... 364/200 |
| 4,286,322 | 8/1981 | Hoffman et al. .................... 364/200 |
| 4,394,727 | 6/1983 | Hoffman et al. .................... 364/200 |
| 4,833,638 | 5/1989 | Vollaro ............................... 364/900 |

OTHER PUBLICATIONS

D. Knuth, The Art of Computer Programming, vol. 3, Sorting and Searching, pp. 397–399.

*Primary Examiner*—Gareth D. Shaw
*Assistant Examiner*—Kakali Chaki
*Attorney, Agent, or Firm*—Kenyon & Kenyon

[57] ABSTRACT

A task dispatch system for use in connection with a plurality of digital data processors for processing tasks. The task dispatch system maintains a task identification queue including a plurality of task identification entries defining a series of tasks to be processed during an iteration. A task dispatcher dispatches tasks to the processors in the order defined by the task identification queue. At the end of an iteration, the task dispatcher reorganizes the entries in the task identification queue so as to dispatch one or more tasks, which were completed last during an iteration, at the beginning of a subsequent iteration.

51 Claims, 5 Drawing Sheets

FIG. 2C
TASK IDENTIFICATION
QUEUE UPDATE OPERATION

FIG. 3

METHOD APPARATUS FOR SCHEDULING TASKS IN REPEATED ITERATIONS IN A DIGITAL DATA PROCESSING SYSTEM HAVING MULTIPLE PROCESSORS

This is a continuation of application Ser. No. 366,774 filed on Jun. 13, 1989 now abandoned

FIELD OF THE INVENTION

The invention relates generally to the field of digital data processing systems, and more particularly to methods and apparatus for scheduling tasks among processors in such systems.

BACKGROUND OF THE INVENTION

A typical digital data processing system includes one or more processors that process programs in the form of a series of "tasks". Generally speaking, a task is a unit of processing which is to be performed by one processor. If a digital data processing system includes a plurality of processors, typically processing can be organized so that the processors may perform at least some of the tasks in parallel, thereby increasing the speed with which processing can be performed.

If a digital data processing system includes a plurality of processors, it is desirable to organize task processing so that all of the processors are kept busy processing tasks to the maximal extent possible, to thereby make maximum use of all of the processors in the system. Under some circumstances, processing may constrained so that, before some tasks can be dispatched for processing by a processor, processing of other tasks must be completed. This may occur, for example, if processing proceeds in a plurality of successive iterations, with each iteration comprising a plurality of tasks, and further with the requirement that all of the tasks of each iteration be completed before processing can begin for any of the tasks for the next iteration. In that case, except in the unlikely event that the time required for the tasks divide equally among the processors, some processors will be idle for at least some period of time towards the end of an iteration.

A number of techniques have been used in connection with the constrained processing described in the previous paragraph to attempt to minimize the amount of idle processor time. In one technique, as a program is being compiled, the compiler assigns tasks to the various processors, which they process during each intration. Alternatively, the tasks can be, for example, maintained in a common area of memory that all of the processors can access, and, when a processor becomes free it can access the list and process the next task on the list.

As a further alternative, various algorithms can be employed at the beginning of an iteration to schedule and allocate tasks among processors by attempting to predict the amount of time each task will take, and the tasks distributed among the processors to attempt to equalize the processing time during the iteration. Typically, the prediction algorithms neglect the observation, which is generally reasonably correct, that a task executed during one iteration will take approximately the same time during the next iteration. Further, the predictive task scheduling algorithms can themselves take a considerable amount of time to process, which may inordinately delay processing during the iteration.

SUMMARY OF THE INVENTION

The invention provides a new and improved arrangement for scheduling and dispatching tasks for processing by multiple processors during an iteration.

In one aspect, the new arrangement provides a digital data processing system comprising a plurality of digital data processors for processing tasks, a task identification queue and a task dispatcher. The task identification queue includes a plurality of task identification entries defining a series of tasks to be processed during an iteration. The task dispatcher dispatches tasks to the processors in the order defined by the task identification queue, and reorganizes the entries in the task identification queue after all of the tasks have been processed during an iteration so that the first one or more tasks dispatched during the next iteration correspond to the last one or more tasks which were completed last during the previous iteration.

In another aspect, the invention provides a task dispatch system for use in connection with a plurality of digital data processors for processing tasks. The task dispatch system dispatches, during an iteration, a series of tasks to the processors in an order defined in a task identification queue. The task identification queue includes a plurality of task identification entries defining a series of tasks to be processed during the iteration. The task dispatch system includes a task dispatcher comprising a task dispatch portion, an iteration termination detector and a task identification queue reorganization portion. The task dispatch portion dispatches tasks to the processor in the order defined by the task identification queue. The iteration termination detector detects when all of the tasks identified by the task identification entries have been processors, and disables the task dispatch portion in response thereto. The task identification queue reorganization portion reorganizes the entries in the task identification queue after the iteration termination detector has detected that all of the tasks have been processed during an iteration so that the task identification entry of one or more of the tasks, which were completed last during the iteration, are dispatched first during a subsequent iteration, and thereafter enables the task dispatch portion.

In yet another aspect, the invention provides a method of operating a digital data processing system comprising a plurality of digital data processors, each for processing tasks. The new method comprises the steps of (i) dispatching tasks to the processors in an order defining an iteration, (ii) detecting when each processor finishes processing a task, and (iii) detecting when the processors have completed processing all of the tasks defining an iteration and, in response thereto, reorganizing the entries in the task identification queue so that one or more of the last-completed tasks will be dispatched at the beginning of a subsequent iteration.

In yet another aspect, the invention provides a task dispatch program, for use in controlling a processor in a digital data processing system comprising a plurality of processors. The task dispatch program comprises a task dispatch portion, an iteration termination detector portion, and a task identification queue reorganization portion. The task dispatch portion enables a processor to dispatch tasks to the processors in the order defined by a task identification queue, which includes a plurality of task identification entries defining a series of tasks to be processed during an iteration. The iteration termination detector portion enables a processor to detect when all of the tasks identified by the task identification entries have been processed, and disables processing of the task dispatch portion in response thereto. The task identification queue reorganization portion enables a processor to reorganize the entries in the task identification queue after all of the tasks have been processed during an iteration so that the task identification entries of a selected number of tasks, which were completed last during the iteration, are dispatched at the beginning of a subsequent iteration, and thereafter enables a processor to begin processing of the task dispatch portion.

In yet another aspect, the invention provides a task dispatch system for use in connection with a plurality of digital data processors. The task dispatch system comprises a task identification queue including a plurality of task identification entries defining a series of tasks to be processed during an iteration, a task assignment list including a plurality of processor assignment entries each associated with one of the processors, and a task dispatcher. The task dispatcher comprises a task dispatch portion, a notification receiver, an undispatched task detector, an iteration termination detector, a task identification queue reorganization portion, and a task assignment list store portion. The task dispatch portion dispatches tasks to the processor in the order defined by the task identification queue. The notification receiver receives notifications from the processors indicating completion of tasks dispatched thereto. The undispatched task detector enables, upon receiving a notification from a processor, the task dispatch portion to dispatch a subsequent task to the processor if the task identification queue includes a task which has not been dispatched during the iteration. The iteration termination detector determines whether all tasks identified by the task identification queue have been processed in response to receipt of a notification by the notification receiver, the iteration termination detector enabling the task identification queue reorganization portion and for disabling the task dispatch portion in response to a positive determination. The task identification queue reorganization portion uses the contents of the task assignment list to reorganize the entries in the task identification queue after the iteration termination detector has detected that all of the tasks have been processed during an iteration so that a selected number of ask identification entries of the task, which were completed last during the iteration, are dispatched at the beginning of a subsequent iteration, and thereafter enabling the task dispatch portion. The task assignment list store portion loads a task identification entry pointer pointing to the task identification entry into the processor's processor assignment entry in the task assignment list.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
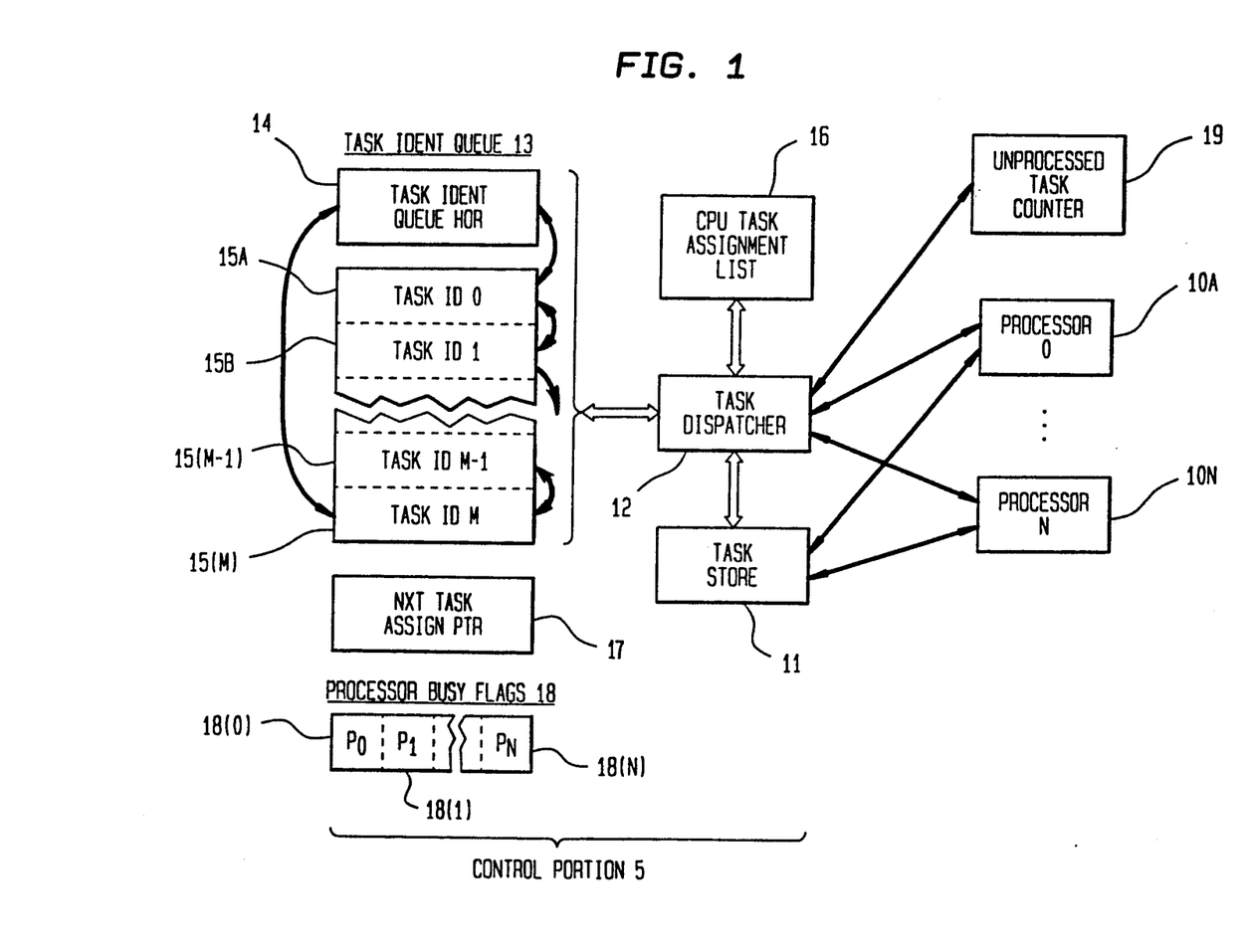
FIG. 1 is a functional block diagram of a digital data processing system constructed in accordance with the invention.

FIG. 1 is a functional block diagram of a digital data processing system constructed in accordance with the invention. With reference to FIG. 1, the system includes a plurality of processors 10A through 10N (generally identified by reference numeral 10) and a control portion 5. The processors 10 process tasks, maintained in a task store 11, under control of a task dispatcher 12. The order in which the task dispatcher 12 dispatches tasks to the various processors 10 is established by a task identification queue 13, which includes a queue header 14 and plurality of queue entries 15A through 15M (generally identified by reference numeral 15).

The task dispatcher 12 dispatches the tasks in the task store 11 to the processors 10 for processing in a plurality of iterations, with each iteration comprising the series of tasks identified by the sequence of entries 15 in the task identification queue 13. If the number of entries 15 in the task identification queue 13 is less than or equal to the number of processors 10, the task dispatcher 12 dispatches tasks to the processors 10 until all of the tasks have been dispatched. If the number of entries 15 in the task identification queue 13 is greater than the number of processors, the task dispatcher 12 dispatches tasks to the processors 10 until all processors 10 have been assigned tasks. As each processor 10 finishes a task, it notifies the task dispatcher 12, and, if there are additional tasks in task store 11 pointed to by the entries 15 in the task identification queue 13, the task dispatcher dispatches the task identified by the next entry 15 to the processor 10.

After the task dispatcher 12 has dispatched the last of the tasks identified by all of the entries 15 in the task identification queue 13, it waits until processors 10 notify it that all of the dispatched tasks have been completed before beginning the next iteration. Prior to beginning the next iteration, the task dispatcher 12 reorganizes the entries 15 in the task identification queue 13. In accordance with the invention, the task dispatcher reorganizes the entries 15 so that the entry 15 pointing to the last selected number of tasks which were completed during the iteration are moved in the queue 13 so as to constitute the first entries 15 in the task identification queue 13. In one embodiment, task dispatcher 12 selects one entry 15, pointing to the last task completed during an iteration, to be moved so as to constitute the first entry 15A, with the order of the other entries remaining the same. As will be described below in connection with FIG. 3, reorganization of the entries 15 in the task identification queue 13 in this manner can reduce or minimize idle time spent by processors 10 in processing tasks during an iteration, and is simpler to implement than, for example, predictive scheduling and task allocation algorithms at the beginning of an iteration to attempt to predict the amount of time each task will take in the next iteration and allocate the tasks among the various processors.

To accommodate the new arrangement, the task dispatcher 12 maintains a processor task assignment list 16, a next task assignment pointer 17, and a set of processor busy flags generally identified by reference numeral 18, with one processor busy flag being provided for each processor 10. The processor task assignment list 16 includes a plurality of entries each associated with a processor 10. The task dispatcher 12, when it assigns a task to a processor 10, loads a pointer into the task assignment list entry, that is associated with the processor 10. The pointer points to the entry 15 in the task identification queue 13 which, in turn, points to the task being assigned to the processor 10. The next task assignment pointer 17 identifies the entry 15 in the task identification queue 13 to be used next in dispatching a task to a processor 10.

The condition of each of the processor busy flags 18 indicate the status of the processor 10 associated therewith. That is, if a processor is processing an assigned task, its processor busy flag 18 is in the set condition, but if a processor 10 is not processing an assigned task, its processor busy flag is in the clear condition. The task dispatcher 12 may set a processor's flag 18 when it dispatches a task thereto for processing, and the processor 10 may thereafter clear its flag 18 when it has finished processing of the assigned task.

Before proceeding further, it would be helpful to briefly describe the structures of the task identification queue 13 and task assignment list 16. The structures of the various queue entries 15 in the task identification queue 13 will not be described in detail herein, but briefly each entry 15(i) includes a field that contains a forward pointer that identifies the next entry 15(i+1), a field that contains a backward pointer that identifies the preceding entry 15(i−1), and a field that identifies a task in the task store 11. The queue header 14 includes a field that contains a forward pointer that points to the first queue entry 15(A) and another field that contains a backward pointer that points to the last entry 15(M) in the task identification queue 13.

The task assignment list 16 comprises a plurality of entries, each associated with one processor 10. When the task dispatcher 12 assigns a task to a processor 10, it stores a pointer, in the processor's entry in the task assignment list 16, to the entry 15 which it used to identify the task being assigned. It will be appreciated that, during an iteration, a task in task store 11 may be assigned multiple times, if the task identification queue 13 includes a plurality of entries 15 which point to the task. When a processor 10 notifies the task dispatcher 12 that it has completed processing of a task assigned to it, the task dispatcher 12 may use the next task assignment pointer 17 and the processor busy flags 18 to determine, respectively, that all entries 15 in the task identification queue 13 have been used in dispatching tasks and that the notifying processor 10 is the last processor 10 to be processing a task. When that occurs, the task dispatcher 12 may identify the entry 15 which was last used in dispatching the task to the processor 10 by reference to the contents of the entry in the task assignment list 16 associated with the last notifying processor 10, and thereafter move that entry 15 to the head of the task identification queue 13.

Figure 2A:
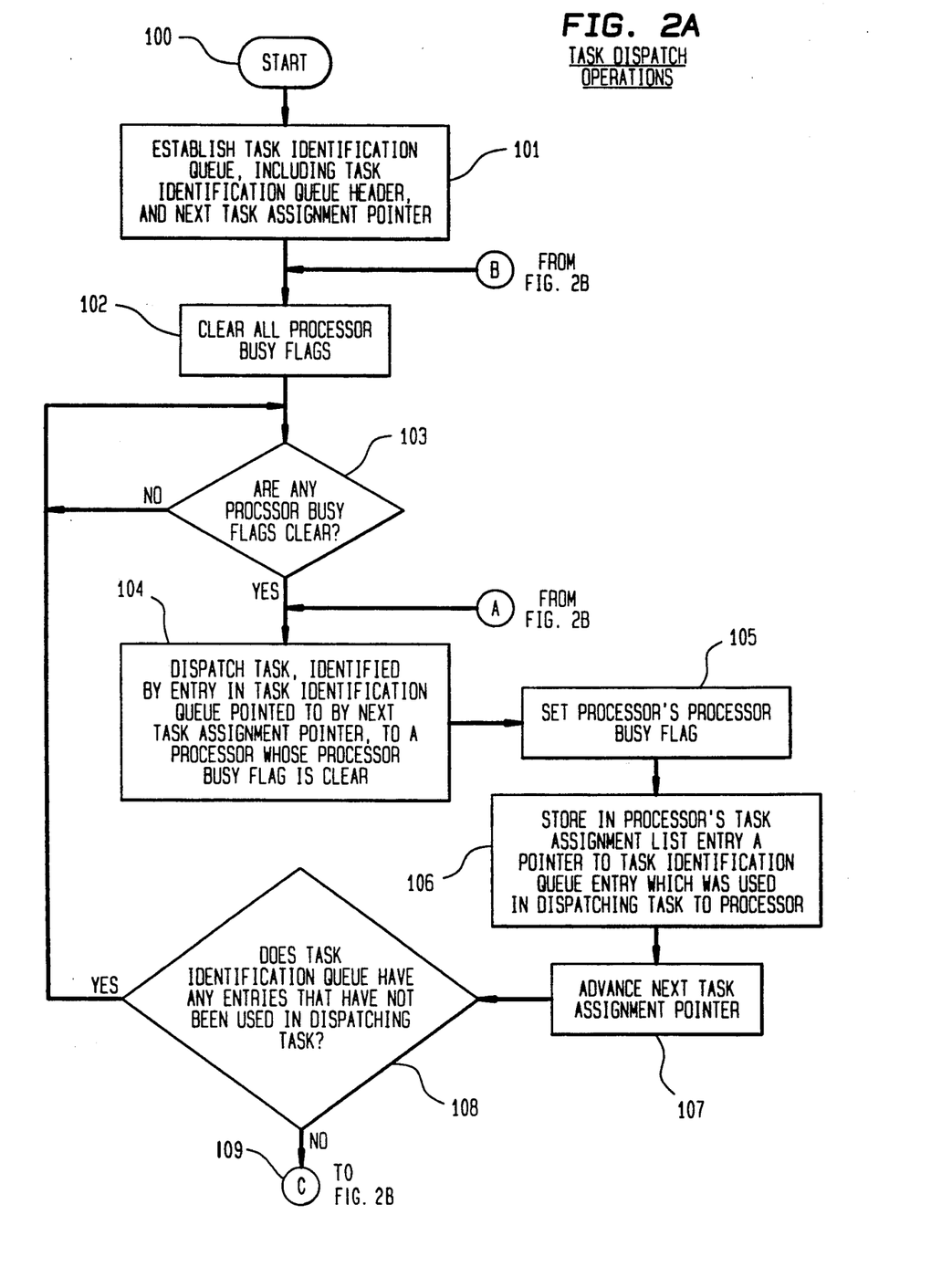
FIGS. 2A through 2C are flow diagrams detailing operations performed by a task dispatcher in the digital data processing system depicted in FIG. 1.
Figure 2B:
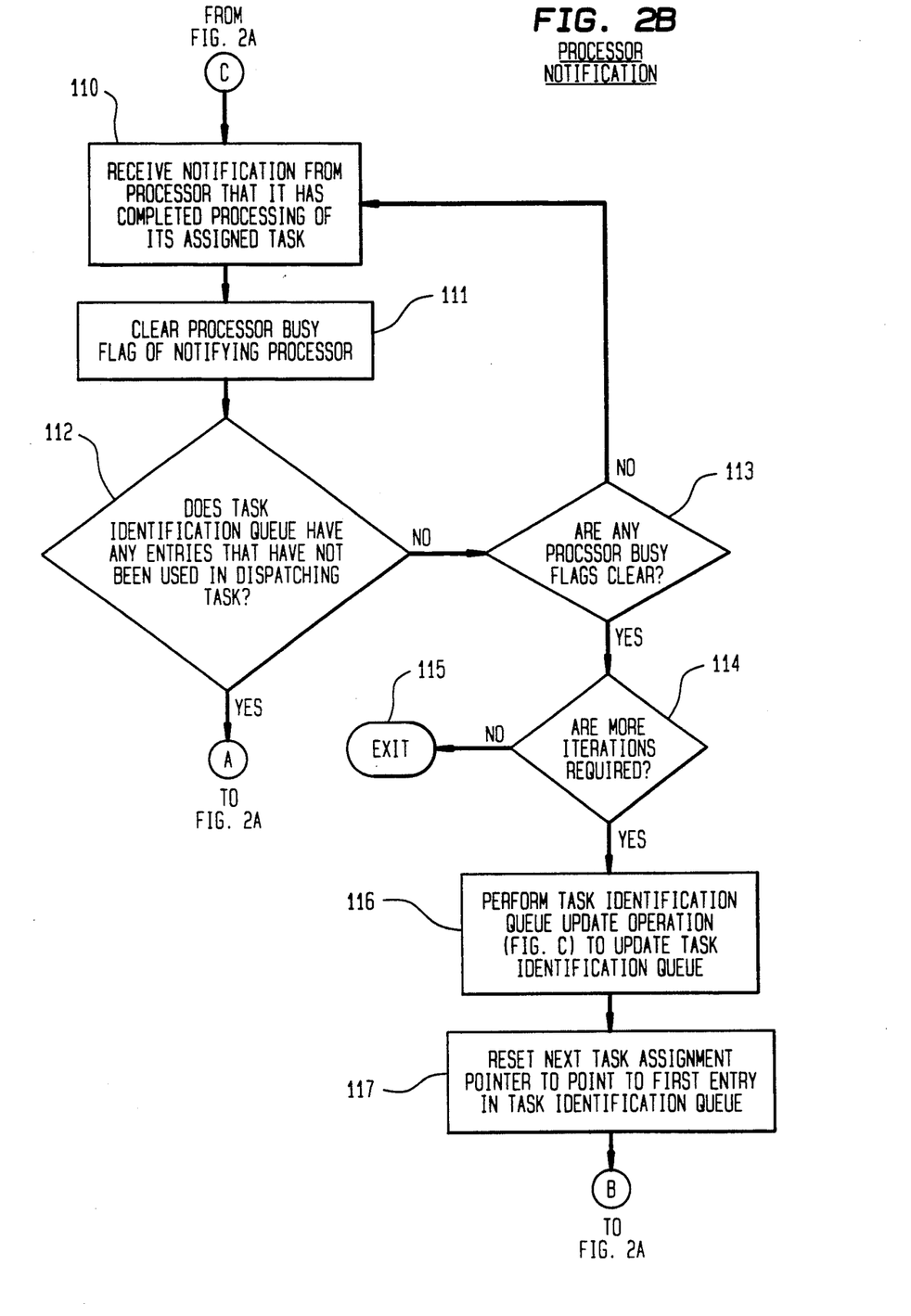
Figure 2C:
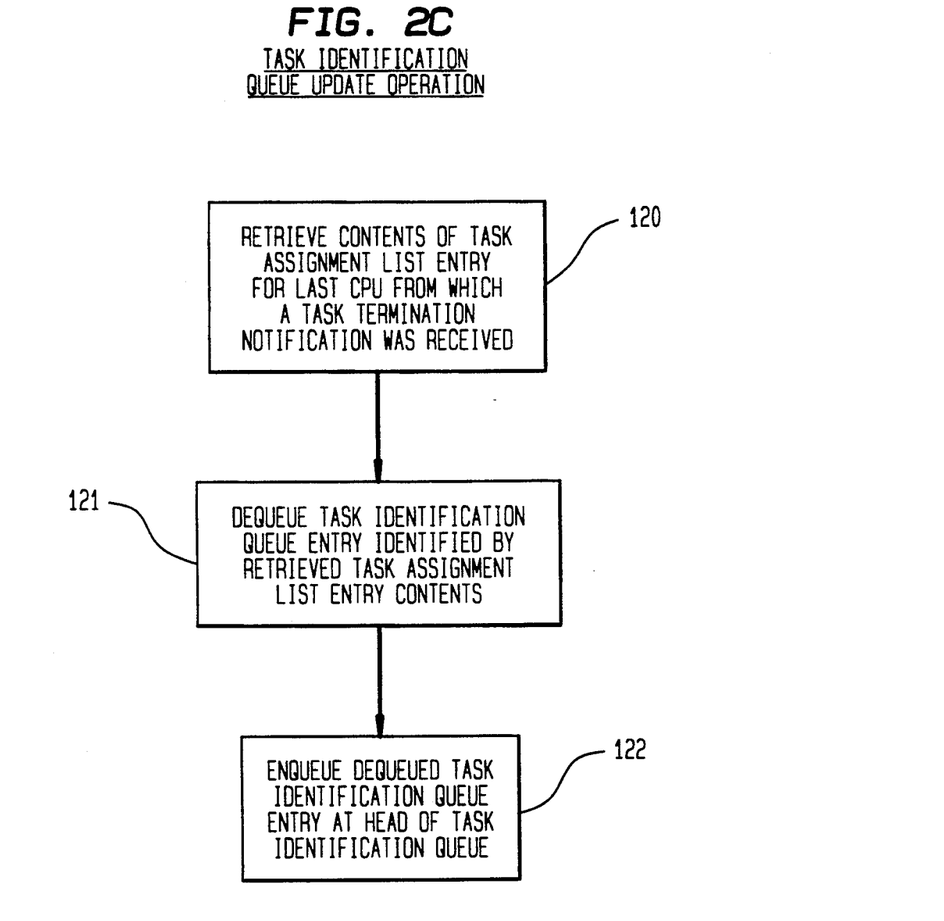

With this background, the detailed operations performed by the task dispatcher 12 will be described with reference to FIGS. 2A through 2C. FIG. 2A depicts the general operations performed by the task dispatcher 12 in assigning tasks to the various processors 10 during an iteration, FIG. 2B depicts the operations performed by the task dispatcher 12 on receiving notification from a processor 10 that it has completed processing of an assigned task, and FIG. 2C depicts the operations performed by the task dispatcher 12 at the end of an iteration to modify the sequence of entries in the task identification queue 13. The task dispatcher 12 may perform the operations depicted in FIGS. 2A and 2B generally concurrently, particularly since it may receive notification from a processor that it has completed processing of an assigned task while it is contemporaneously assigning tasks to the various processors 10.

The task dispatcher 12 operates in two general sequences in assigning tasks to the processors 10 during an iteration, as shown in FIG. 2A. At the beginning of an iteration, the task dispatcher performs an initialization sequence, comprising steps 100 through 102, during which it sets up the task identification queue 13 and establishes various criteria for terminating operations during the iteration. In the second sequence, comprising steps 103 through 108, the task dispatcher 12 generally dispatches tasks to the various processors 10. At the beginning of an iteration, the task dispatcher 12 dispatches the tasks identified by the sequential entries 15 in the task identification queue 13 until all of the processors 10 have received tasks.

Thereafter, as described below in connection with FIG. 2B, when the task dispatcher 12 receives notification from a processor 10 that it has completed processing of the task previously assigned thereto it dispatches another task to the processor 10 until all of the tasks identified by entries 15 in the task identification queue 13 have been dispatched. Upon receiving notification from a processor 10 that it has completed processing a task assigned thereto, the task dispatcher 12 also determines whether it is the last task to be completed. If not, and if there are additional tasks to be dispatched, the task dispatcher 12 returns to the sequence depicted in FIG. 2A, in which it continues dispatching tasks. However, if the task dispatcher 12 determines, following notification from a processor that it has completed processing a task assigned thereto, and if a controlling external program requires a subsequent iteration, it steps to the sequence depicted in FIG. 2C to re-order the task identification queue so that the entries 15 pointing to the last one or more tasks to be completed are moved to the head of the queue and tasks to which they point are dispatched first during the next iteration.

More specifically, when the task dispatcher 12 initially is called by an external controlling program (not shown) to begin an iteration (step 100) it sets up the task identification queue 13, including the task identification queue header 14 and one or more queue entries 15 pointing to tasks to be dispatched (step 101). In addition, the task dispatcher 12 establishes the next task assignment pointer to point to the first entry 15 in the task identification queue 13. It will be appreciated that, if the task identification queue 13 is empty, that is, if it contains no entries 15 after step 101, the task dispatcher 12 may exit at that point and return control to the external controlling program. After step 101, if the task dispatcher determines that the task identification queue 13 is not empty, that is, if it contains at least one entry 15, it (that is, the task dispatcher 12) clears all of the processor busy flags 18 for all of the processors 10.

After clearing the processor busy flags 18, the task dispatcher 12 sequences to step 103, in which it determines whether any of the processor busy flags 18 are clear. At the beginning of an iteration, all of the processor busy flags 18 are clear, and so the task dispatcher 12 sequences to a series of steps 104 through 107, in which it dispatches tasks, identified by the entries 15 in the task identification queue 13, to the various processors 10. The task dispatcher 12 first enables a processor 10 whose processor busy flag 18 is clear to process the task in the task store 11 pointed to by the next task assignment pointer 17 (step 104) and sets the processor busy flag 18 of the processor 10 to indicate that the processor has been assigned a task (step 105). Thereafter, the task dispatcher 12 stores, in the processor's entry in the task assignment list 16, a pointer to the entry 15 in the task identification queue 13 which was used in dispatching the task to the processor (step 106). It will be appreciated that the pointer stored in the task assignment list may be copied from the next task assignment pointer 17, since that pointer 17 points to the entry 15 that was used to dispatch a task to the processor 10. The pointer in the processor's entry in the task assignment list 16 may be used, as described below in connection with FIG. 2B, to identify the entry 15 if the task is the last to be completed.

Following step 106, the task dispatcher 12 advances the next task assignment pointer 17 (step 107) and determines whether the task identification queue 13 includes any entries 15 which have not been used in dispatching tasks (step 108). The new value for the pointer in the next task assignment pointer 17 may be obtained from the forward pointer of the entry 15 that was used, in step 104, in dispatching the task to the processor 10. It will be appreciated that the next task assignment pointer 17 may point to another entry 15 in the task identification queue 13, or it may point to the header 14 of the task identification queue. If there are any additional tasks to be dispatched, the next task assignment pointer 17 will point to the entry 15 of the task identification queue 13 to be used in dispatching the next task, but if the next task assignment pointer points to the header 14 of the task identification queue, all tasks identified by entries 15 have been used in dispatching. Therefore, after advancing the next task identification pointer 17 (step 107), the task dispatcher 12 may determine whether the task identification queue 13 includes any additional entries 15 to be used (step 108) by testing the next task assignment pointer 17 to determine whether it point to the header 14. If so, the task dispatcher 12 has dispatched the tasks identified by all of the entries 15 in the task identification queue, and so it exits (step 109) the task dispatch portion of its operations, that is, the operations depicted on FIG. 2A. Thereafter, the task dispatcher 12 will be awaiting notifications from the processors 10 relating to tasks which have not yet been completed, as described below in connection with FIG. 2B.

On the other hand, if the task dispatcher 12 determines, in step 108, that the task identification queue 13 contains additional entries 15 to be used in dispatching tasks, it returns to step 103. The task dispatcher iteratively performs steps 103 through 108 until it determines, in step 103, that none of the processor busy flags 18 are set, indicating that all of the processors are then processing tasks. At that point, the task dispatcher 12 stalls at step 103 until a processor busy flag 18 becomes clear as a result of a notification by a processor 10 that it has completed processing of a task, as described below (step 111, FIG. 2B). After the task dispatcher determines in step 103 that a processor 10 has become free, it may proceed to perform steps 104 through 108 to dispatch a task to it. At some point, as noted above, the task dispatcher 12 will determine, in step 108, that it has dispatched tasks identified by all of the entries in the task identification queue, at which point it, in step 109, exits the task dispatch portion of its operations.

FIG. 2B depicts operations performed by the task dispatcher 12 in response to a notification by a processor 10 that it has completed processing of a task that was dispatched to it in step 104 (FIG. 2A). With reference to FIG. 2B, the task dispatcher 12, upon receipt of notification from a processor 10 that it has completed processing of a task (step 110), first clears the processor busy flag 18 associated with the notifying processor (step 111). Thereafter, the task dispatcher 12 determines whether the task identification queue 13 includes any entries 15 that have not been used in dispatching tasks (step 112), and if so, it returns to step 104 (FIG. 2A) to continue dispatching tasks to the various processors 10. It will be appreciated that the task dispatcher 12 may return to step 104 directly, rather than to step 103, in which it would test the processor busy flags 18, since it cleared a processor busy flag in step 111 thereby ensuring at least one processor 10 whose processor busy flag is clear.

However, if the task dispatcher 12 determines, in step 112, that all entries 15 of the task identification queue 13 have been used in dispatching tasks, it sequences to step 113 in which it determines whether all of the processor busy flags are clear. If not, the processors 10 have not completed processing all of the tasks, and so the task dispatcher 12 returns to step 110 to await a subsequent notification by a processor 10.

However, if the task dispatcher 12 determines, in step 113, that all of the processor busy flags 18 are clear, it sequences to step 114 in which it determines whether the external controlling program (not shown) requires any additional iterations. If not, the task dispatcher exits (step 115), returning control to the external controlling program.

On the other hand, if the task dispatcher 12 determines, in step 114, that the external controlling program requires an additional iteration, it sequences to step 116, in which it performs a task identification queue update operation (described below in connection with FIG. 2C) to update the task identification queue 13, that is, to reorder the entries 15 in the task identification queue 13 so that entries 15 relating to a last task to be completed are moved to the beginning of the queue 13. The task dispatcher 12 uses the contents of the entries in the task assignment list 16 to identify an entry 15 pointing to a last-completed task. After reordering the entries 15 in the task identification queue 13, the task dispatcher 12 resets the next task assignment pointer to point to the new first entry 15 in the task identification queue 13, and returns to step 102 (FIG. 2B) to dispatch the tasks, in the order identified by the task identification queue, during the next iteration.

As noted above, in connection with step 116 (FIG. 2B), the task dispatcher 12 may, after (1) receiving the notification from a processor 10 that it has finished processing its assigned task and (2) determining that processing of tasks pointed to by all of the entries 15 has been completed, reorder the entries 15 in the task identification queue 13 so that one or more of the entries 15 relating to the last completed tasks are moved to the beginning of the queue 13, so that they may be used to dispatch tasks at the beginning of the next iteration. In the following, it will be assumed that only one entry 15, which points to the last-completed task, is moved to the beginning of the task identification queue 13. In this operation, the task dispatcher first retrieves the contents of the entry in the task assignment list 16 associated with the processor 10 from which it received the notification (step 120). The contents retrieved from the task assignment list 16 points to the entry 15(i) in the task identification queue 13 that, in turn, identified the last finished task in the task store 11. The task dispatcher 12 then dequeues the entry 15(i) in the task identification queue 13 identified by the contents retrieved in step 120 (step 121) and enqueues it at the head of the task identification queue 13 (step 122).

More specifically, in the dequeue operation in step 121, the task dispatcher 12 performs several steps to link the entries 15(i−1) and 15(i+1). In particular the task dispatcher 12 (1) loads the forward pointer of the entry 15(i), which points to entry 15(i+1) into the forward pointer of the entry 15(i−1), to enable the forward pointer of entry 15(i−1) to point to entry 15(i+1), and (2) loads the backward pointer of entry 15(i) into the backward pointer of entry 15(i+1), to enable the backward pointer of entry 15(i+1) to point to entry 15(i−1). These operations link the entries 15(i−1) and 15(i+1). If the entry 15N is being moved to the head of the task identification queue 13, the task dispatcher 12 loads the forward pointer of the entry 15N into the forward pointer of the entry 15(N−1) to enable that entry to point to the header 14 of the queue 13. The task dispatcher 12 further loads the backward pointer of the entry 15N into the backward pointer of header 14 so that the header 14 thereby points to entry 15(N−1), thereby establishing entry 15(N−1) as the last entry in the queue 13.

In the enqueue operation in step 122, the task dispatcher 12 performs several steps to link the dequeued entry 15(i) at the head of the queue. In this operation, the task dispatcher 12 (1) loads the contents of the forward pointer of the queue header 14 into the forward pointer of the entry 15(i), (2) loads a pointer to the header 14 into the backward pointer of entry 15(i), and (3) loads a pointer to the entry 15(i) into the forward pointer of the queue header 14 and the backward pointer of the previous first entry 15A in the task identification queue 13. These operations establish (1) the forward pointer of header 14 as pointing to the entry 15(i) and the forward pointer of the entry 15(i) as pointing to the previous first entry 15A of the queue 13, and (2) the backward pointer of entry 15(i) as pointing to the header 14 and the backward pointer of the entry 15A as pointing to the entry 15(i), thereby linking the entry 15(i) as the first entry in the task identification queue 13. Thus, the entry, which identified the last-completed task during the previous iteration, will be used by the task dispatcher 12 to dispatch the first task during the next iteration, while the order of dispatch of the other tasks, as identified by the other entries 15 in the task identification queue 13, will remain the same.

Figure 3:
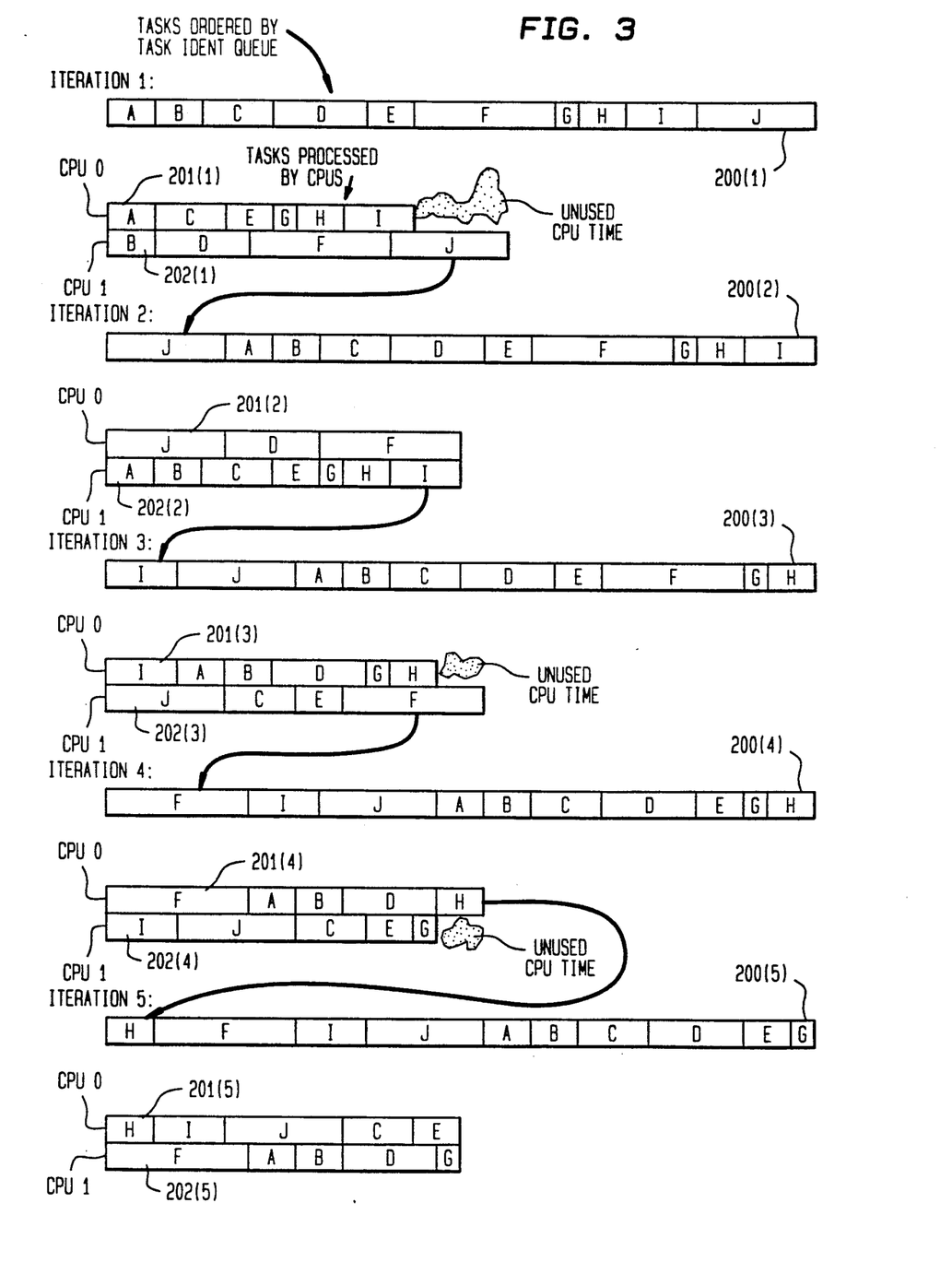
FIG. 3 is a timing diagram useful in understanding the operation of the system depicted in FIG. 1.

The operation of using the entry 15 in the task identification queue 13 which identified the last-completed task during the previous iteration as the first entry 15 for dispatching a task during next iteration will be described in connection with an example depicted in FIG. 3. FIG. 3 depicts task dispatching during five iterations, identified as Iteration 1 through Iteration 5. For each iteration, the FIG. depicts a task bar time line 200(1) through 200(5) (generally identified as task bar time line 200) which comprises a plurality of blocks identified by letters A through J, whose relative widths represent relative times for processing each of ten tasks which are also identified by letters A through J. The order of the tasks A through J from left to right represents the order the tasks are listed in entries 15 in the task identification queue 13. Thus, the ten tasks are dispatched, in the order from left to right as shown in the FIG., by task dispatcher 12 during an iteration. It is often the case that time to process a task will not vary substantially from iteration to iteration, and so the relative widths of the blocks are the same in all of the task bar time lines 200(1) through 200(5).

In the example depicted in FIG. 3, the digital data processing system processing the tasks includes two processors, identified as CPU 0 and CPU 1. Below the respective task bar time lines 200(1) through 200(5) are CPU 0 time lines 201(1) through 201(5), which identify the tasks dispatched to, and processed by, CPU 0 during the iteration, and CPU 1 time lines 202(1) through 202(5), which identify the tasks dispatched to, and processed by, CPU 1 during the iteration. Thus, for example, under Iteration 1 the CPU 0 time line 201(1) indicates that the task dispatcher 12 dispatches tasks A, C, E, G, H and I to processor CPU 0, and tasks B, D, F and J to processor CPU 1. In particular, at the beginning of the iteration, the task dispatcher 12 dispatches task A, the task identified in the first entry 15A in the task identification queue 13, to the processor CPU 0, and task B, the task identified in the second entry 15B in the task identification queue 13, to the processor CPU 1.

As shown in FIG. 3, the processors CPU 0 and CPU 1 require approximately the same time to process tasks A and B, and so they notify the task dispatcher of completion at approximately the same time. Thus, the task dispatcher 12 dispatches the task identified by the third entry 15C in the task identification queue 13, namely, task C, to processor CPU 0 and the task identified by the fourth entry 15D, namely, task D, to processor CPU 1. Since processor CPU 0 finishes processing task C and notifies the task dispatcher 12 thereof before processor CPU 1 finishes processing task D, the task dispatcher 12 dispatches the task identified by the fifth entry 15E in the task identification queue 13, namely, task E, to the processor CPU 0 for processing. When the processor CPU 1 later finishes processing of task C and notifies the task dispatcher 12, which occurs before CPU 0 has finished processing of task E, the task dispatcher dispatches the task identified by the sixth entry 15F in the task identification queue, namely, task F, to the processor CPU 1 for processing. The dispatching of the remaining tasks G through J continues in the same manner.

As can be seen in FIG. 3, the processor CPU 0 finishes processing task I, some time before the processor CPU 1 finishes processing task J. As described above, the task dispatcher 12 waits until tasks identified by all of the entries 15, which comprises tasks A through J, have been processed before it begins dispatching tasks for the next iteration, in this case Iteration 2. Thus, processor CPU 0 is idle from the time it finishes processing task I and the time processor CPU 1 finishes processing task J, which is identified on FIG. 3 as "UNUSED CPU TIME".

After being notified by processor CPU 1 that it has finished processing of task J, the task dispatcher 12 performs the operations depicted in FIG. 2B to reorganize the entries 15 in the task identification queue 13 to move the tenth entry 15J, which identifies task J, to the beginning of the task identification queue. Thus, for Iteration 2 the first task dispatcher will be task J, as shown under Iteration 2 in FIG. 3. During Iteration 2 the task dispatcher 12 dispatches the other tasks in the order depicted in the task bar time line 200(2), so that the processors process the tasks J and A through I in the order depicted in the CPU time lines 201(2) and 202(2). As shown in FIG. 3, the two processors finish processing of the last tasks dispatched to them during the iteration at substantially the same time. When the task dispatcher 12 is notified of the termination of processing of task I, the last task whose processing is finished, it reorganized the task identification queue 13 to identify it first in Iteration 3.

The operations of task dispatcher 12 and processors CPU 0 and CPU 1 are substantially the same in succeeding Iterations 3 through 5, although the order of processing of the various tasks varies. In the example depicted in FIG. 3, during Iteration 3, processor CPU 0 is idle for a time during which processor CPU 1 is finishing processing of its last task during the iteration, and during Iteration 4 processor CPU 1 is idle for a time during which processor CPU 0 is finishing processing of its last task during the iteration. During both Iterations 3 and 4 the idle processor time, identified by the legend "UNUSED CPU TIME" in the Figure, is less than the amount of idle processor time during Iteration 1. During Iteration 5, both processors finish processing their last tasks at substantially the same time, as shown in CPU time lines 201(5) and 202(5). The new task dispatch system, by reorganizing the task identification queue 13 at the end of the iteration, tends to reduce the amount of idle processor time at the end of an iteration, and does so without requiring processing of complex prediction algorithms or assignment of tasks to the various processors by a compiler at compile time.

The embodiment depicted in FIG. 1 has been described as including a task assignment list 16 for keeping track of the entries 15 that identify the various tasks dispatched to the various processors 10 and a set of processor busy flags 18. With these elements, the task dispatcher 12 may (1) determine, using the processor busy flags 18, when all of the tasks have been completed for an iteration and (2) identify, using the task assignment list 16, the task identification entry 15 which points to the last completed task.

The control portion 5 may comprise a suitably programmed digital data processor, a computer program which may be executed by one or more digital data processors, or, alternatively, it may comprise special purpose hardware. If the control portion 5 comprises a programmed digital data processor, it will be appreciated that the digital data processor may also comprise one of the processors 10 which process tasks identified by the various entries 15 of the task identification queue 13, and may additionally perform the operations noted above for the task dispatcher 12.

Alternatively, all of the processors 10 may perform the operations described above for the task dispatcher 12. In particular, the processors 10 may initiate task dispatch operations in step 104 through 108 to dispatch tasks to themselves, which they then process. In addition, when a processor 10 finishes processing of a task, it may generally perform the operations depicted in FIG. 2B, particularly steps 111 through 117 to clear its own processor busy flag 18 (step 111) and either obtain an additional task (step 112) or determine whether it is the last to complete processing of the tasks (step 113) and thereafter perform steps 114 through 117.

Other embodiments within the scope of the invention may include one or neither of the task assignment list 16 or the processor busy flags 18. For example, instead of the processed task counter 17, each entry 15 in the task identification queue 13 may include a DONE flag (not shown). The task dispatcher 12 clears the DONE flags in all of the entries at the beginning of an iteration, and sets the DONE flag in an entry 15 when the processor 10 processing the task pointed to by the entry 15 notifies the task dispatcher 12 that it has completed the task. To determine whether processing has been completed in connection with tasks pointed to by all of the entries 15 in the task identification queue 13, the task dispatcher 12 may scan the entries 15 to determine the states of the respective DONE flags. Since it is likely that the tasks identified by the entries 15 towards the beginning of the queue 13 will be completed before those at the end of the queue 13, the task dispatcher 12 may scan the entries 15 from the end of the queue toward the beginning, that is, from the entry 15M toward entry 15A, which can reduce the time required for the task dispatcher to locate a clear DONE flag if there is one.

In addition, instead of processor busy flags 18, an unprocessed task counter 19 can be provided to keep track of the number of tasks for which processing has not been completed during an iteration. At the beginning of an iteration, the task dispatcher 12 may load the unprocessed task counter 19 with a value identifying the number of entries 15 in the task identification queue 13. When a processor 10 has completed processing of a task and notifies the task dispatcher 12 thereof, the task dispatcher 12 will decrement the unprocessed task counter by "one" and test the value of the unprocessed task counter 19. The task dispatcher identifies when the last task has been completed when the count value of the unprocessed task counter 19 reaches zero.

The task assignment list 16 can be eliminated if the processors, when they notify the task dispatcher 12 that they have completed a task, identify the task as part of the notification. Alternatively, the entries 15 in the task identification queue 13 may include an additional field that identifies the processor processing the task identified thereby, and the task dispatcher may, upon notification by a processor 10 that it has completed the task, scan the entries 15 to identify the entry pointing to the just-completed task.

Alternatively, if the entries 15 in the task identification queue 13 are constrained so that each identifies a unique task in the task store 11, the task assignment list 16 can store the pointer to the task than it dispatches to a processor 10 rather that a pointer to the entry 15 which pointed to the task. In that case, when a processor 10 notifies the task dispatcher 12 that it has finished processing a task, the task dispatcher 12 can locate the entry 15 pointing to that task. The task dispatcher can scan the entries 15 to locate that entry 15 whose task pointer corresponds to the task pointer corresponding to the processor 10 that just completed the task.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital data processing system comprising:
   A. a plurality of digital data processors for processing a plurality of tasks;
   B. a task identification queue for storing a plurality of task identification entries arranged in an order, where each one of the plurality of task identification entries correspondingly represents one of the plurality of tasks, respectively; and C. a task dispatcher comprising means for sequentially dispatching the plurality of tasks to said plurality of digital data processors by sequentially referring to the plurality of task identification entries in the order that the plurality of task identification entries are arranged in said task identification queue to retrieve the plurality of tasks, and means for reordering the plurality of task identification entries in said task identification queue after all of the tasks represented by the plurality of task identification entries have been sequentially dispatched and processed so that a last one of the plurality of tasks to be processed has its representative one of the plurality of task identification entries placed at the beginning of said task identification queue.

2. The digital data processing system as defined in claim 1 further comprising a task assignment list including a plurality of entries, each entry being associated with one of said plurality of digital data processors, wherein the task dispatcher includes means for storing a reference to the task identification entry representative of the dispatched task in one of the plurality of entries in said task assignment list associated with said one of the plurality of digital data processors processing the dispatched task upon dispatching each one of the plurality of tasks to one of said plurality of digital data processors.

3. The digital data processing system as defined in claim 2 wherein each one of the plurality of digital data processors further comprises means for notifying said task dispatcher when said digital data processor completes processing a task dispatched thereto.

4. The digital data processing system as defined in claim 3 wherein said task dispatcher further comprises means for determining a last one of the plurality of digital data processors to complete processing and means for identifying the one of the plurality of task identification entries in said task identification queue to be moved to the beginning of said task identification queue by using an associated entry in said task assignment list relating to the last one of the plurality of digital data processors to complete processing.

5. The digital data processing system as defined in claim 4 wherein each of the plurality of task identification entries in said task identification queue further includes a forward pointer field containing a forward pointer identifying a next one of the plurality of task identification entries in said task identification queue.

6. The digital data processing system as defined in claim 5 wherein said task identification queue further comprises a header stored in said task identification queue, said header including a pointer to the first one of the plurality of task identification entries in said task identification queue and wherein the forward pointer of the last one of the plurality of task identification entries in said task identification queue identifies the header.

7. The digital data processing system as defined in claim 6 further comprising a next task assignment pointer coupled to said task identification queue, said next task assignment pointer containing a value which identifies one of the plurality of task identification entries in said task identification queue representative of a next task to be dispatched to one of said plurality of digital data processors.

8. The digital data processing system as defined in claim 7 further comprising means for determining when said next task assignment pointer identifies the header to ascertain when the plurality of tasks represented by the plurality of task assignment entries have been dispatched, said means for determining being coupled to said reordering means.

9. The digital data processing system as defined in claim 8 further comprising an unprocessed task counter including an identifier which represents the number of the plurality of tasks that have not completed processing, said task dispatcher using said unprocessed task counter to determine when all tasks identified by the plurality of task identification entries in said task identification queue have been processed.

10. The digital data processing system as defined in claim 9 wherein said task dispatcher further comprises means for initializing said unprocessed task counter to represent the total number of the plurality of tasks to be dispatched and means for adjusting the identifier of said unprocessed task counter upon receiving notification that the processing of a task has been completed.

11. The digital data processing system as defined in claim 10 wherein said task dispatcher further comprises means for determining that the last one of the plurality of digital data processors to notify said task dispatcher of completing a task dispatched thereto is the last one of the plurality of digital data processors to complete processing when said unprocessed task counter reaches a predetermined termination value.

12. The digital data processing system as defined in claim 8 further comprising a plurality of processor busy flags, where one of the plurality of processor busy flag is associated with one of said plurality of digital data processors, respectively, said task dispatcher using said plurality of processor busy flags to determine when the plurality of tasks represented by the plurality of task identification entries in the task identification queue have been processed.

13. The digital data processing system as defined in claim 12 wherein the task dispatcher further comprises means for determining when the plurality of digital data processors are available for processing the plurality of tasks by examining the plurality of processor busy flags associated with each one of the plurality of the digital data processors, each of the plurality of digital data processors being unavailable for processing when its associated processor busy flag is set and being available for processing when its associated processor busy flag is cleared.

14. The digital data processing system as defined in claim 8 wherein said task identification queue further comprises a plurality of done flags associated with the plurality of task identification entries, each one of the plurality of done flags being set when one of the plurality of digital data processors notifies the task dispatcher that it has completed processing the task associated with the task identification entry dispatched thereto, the task dispatcher determining that the last digital data processor to notify said task dispatcher of completing the task dispatched thereto is the last processor to complete processing when all done flags are set.

15. The digital data processing system as defined in claim 7 wherein the value of said next task assignment pointer is determined by the forward pointer field of the task identification entry representative of the task most recently dispatched.

16. A task dispatch system for use in connection with a plurality of digital data processors for processing tasks, where each one of the tasks can be processed more than once, the task dispatch system comprising:
   a task dispatcher for dispatching the tasks to the plurality of digital data processors;
   a task identification queue coupled to the task dispatcher, the task identification queue including a plurality of task identification entries, initially arranged in an initial predefined order, the order of the task identification queue used by the task dispatcher to determine which task is to be dispatched, each one of the plurality of task identification entries correspondingly representative of one of the tasks to be processed; and
   a dispatch order determining portion coupled to the task identification queue, the dispatch order determining portion including means for reorganizing the initial predefined order of the task identification queue at the end of an iteration through said task identification queue into a reorganized order, wherein an iteration comprises dispatching and processing every one of the tasks represented by the plurality of task identification entries in order, so that the task dispatcher dispatches a preselected number of tasks which completed processing at the end of an iteration, at the beginning of a subsequent iteration, wherein the tasks are dispatched by the task dispatcher in the reorganized order.

17. The task dispatch system as defined in claim 16 wherein said task dispatcher further comprises a task dispatch portion for sequentially dispatching the tasks to be processed to said plurality of digital data processors in the order that the plurality of task identification entries are arranged in said task identification queue.

18. The task dispatch system as defined in claim 17 further comprising an iteration termination detector coupled to the task dispatcher, the iteration termination detector for detecting when all of the tasks represented by the task identification entries have been processed by the plurality of digital data processors and for disabling the task dispatcher after all of the tasks represented by the task identification entries have been dispatched.

19. The task dispatch system as defined in claim 18 wherein said dispatch order determining portion further comprises a task identification queue reorganization portion comprising
   means for placing a preselected number of tasks at the beginning of the task identification queue;
   means for determining the preselected number of tasks completed last during an iteration; and
   means for reorganizing the task identification entries in said task identification queue after the iteration termination detector has detected that all of the tasks have been processed during an iteration so that the task identification entries of the preselected number of tasks completed last during an iteration, are placed at the beginning of the task identification queue, and for thereafter enabling the task dispatcher.

20. The task dispatch system as defined in claim 19 further comprising a task assignment list, including a plurality of entries, each entry being associated with one of said plurality of digital data processors, wherein the task dispatcher, upon dispatching each one of the tasks to one of said digital data processors, stores a reference to the task identification entry representative of the dispatched task in one of the plurality of entries in said task assignment list associated with said one of the plurality of digital data processors processing the dispatched task.

21. The task dispatch system as defined in claim 20 wherein each one of the plurality of digital data processors further comprises means for notifying said task dispatcher when each digital data processor completes processing of a task dispatched thereto, said means for notifying coupled to said iteration termination detector.

22. The task dispatch system as defined in claim 21 wherein said task dispatcher further comprises:
   a notification receiver for receiving notifications from the digital data processors indicating completion of tasks dispatched thereto;
   detector means for determining if each one of the tasks represented by the plurality of task identification entries in the task identification queue has not been dispatched; and
   an undispatched task detector for enabling, upon receiving a notification from one of the plurality of digital data processors, the task dispatcher to dispatch a task to the one of the plurality of digital data processors if one of the tasks represented by the plurality of task identification entries in the task identification queue has not been dispatched during an iteration.

23. The task dispatch system as defined in claim 22 wherein said dispatch order determining portion further comprises means for identifying the task identification entries in said task identification queue to be moved to the beginning of said task identification queue by using an associated entry in said task assignment list relating to one of said plurality of digital data processors to complete processing.

24. The task dispatch system as defined in claim 23 wherein each task identification entry in the task identification queue further includes a forward pointer field containing a forward pointer identifying the next task identification entry in said task identification queue.

25. The task dispatch system as defined in claim 24 wherein said task identification queue further comprises a header stored in said task identification queue, said header including a pointer to the first one of the plurality of task identification entries in said task identification queue and wherein the forward pointer of the last one of the plurality of task identification entries in said task identification queue identifies the header.

26. The task dispatch system as defined in claim 25 further comprising a next task assignment pointer coupled to said task identification queue, said next task assignment pointer containing a value which identifies one of a plurality of task identification entries in said task identification queue representative of a next task to be dispatched to one of said plurality of digital data processors.

27. The task dispatch system as defined in claim 26 wherein the task dispatcher further comprises an end-queue detector portion, said end-queue detector portion notifying the detector means that each one of the tasks represented by the plurality of task assignment entries have been dispatched in an iteration when the next task assignment pointer identifies the header.

28. The task dispatch system as defined in claim 27 further comprising an unprocessed task counter coupled to the task dispatcher for maintaining a count of unprocessed tasks, the iteration termination detector using said unprocessed task counter to determine when the tasks identified by task identification entries in the task identification queue have been processed.

29. The task dispatch system as defined in claim 28 wherein the task dispatcher further comprises:
an initialization portion which loads said unprocessed task counter with an initial value at the beginning of an iteration;
an unprocessed task counter adjustment portion for adjusting said unprocessed task counter in response to receipt of notifications by the notification receiver; and
an iteration determination detector for determining the end of an iteration when the value of said unprocessed task counter reaches a predetermined termination value.

30. The task dispatch system as defined in claim 29 wherein the initialization portion further comprises means for loading said unprocessed task counter with a value associated with the number of task identification entries in said task identification queue, and wherein the unprocessed task counter adjustment portion further comprises means for decrementing said unprocessed task counter upon each notification.

31. The task dispatch system as defined in claim 21 further comprising a plurality of processor busy flags, where one of the plurality of processor busy flags in associated with one of said digital data processors, respectively, said task dispatcher using said plurality of processor busy flags to determine when the tasks represented by the plurality of task identification entries in the task identification queue have been processed.

32. The task dispatch system as defined in claim 31 wherein the task dispatcher further comprises means for determining when the plurality of digital data processors are available for processing the plurality of tasks by examining the plurality of processor busy flags associated with each one of the plurality of the digital data processors, each of the plurality of digital data processors being unavailable for processing when its associated processor busy flag is set and being available for processing when its associated processor busy flag is cleared.

33. A method of operating a digital data processing system comprising a plurality of digital data processors, each for processing tasks, and a task dispatcher, comprising the steps of:
(a) dispatching one task of a series of tasks by the task dispatcher to an available one of the plurality of digital data processors for processing, wherein the task being dispatched is determined according to a pre-selected order;
(b) determining if each one of the tasks in the series of tasks has been dispatched;
(c) repeating steps (a) and (b) until each one of the tasks in the series of tasks has been dispatched;
(d) detecting a pre-selected number of last completed tasks, wherein a completed task is a task that has been dispatched for processing and the processing has been completed;
(e) reorganizing the pre-selected order of the series of tasks so that the pre-selected number of last completed tasks are placed at the beginning of the reorganized order; and
(f) repeating steps (a) to (c), wherein the reorganized order is used as the preselected order in step (a).

34. The method as defined in claim 33, wherein the task dispatcher further comprises an ordered task identification queue and wherein prior to step (a), the method further comprises the steps of
(a) storing a plurality of task identification entries, each one representative of one of the series of tasks to be processed, and each one having a forward pointer field, in the task identification queue;
(b) linking in an initial predefined order each one of the plurality of task identification entries in the task identification queue by means of the forward pointer field in each task identification entry which stores a forward pointer to the next task identification entry, in the initial predefined order, in the task identification queue;
(c) creating as reference to the task identification queue, a header comprising fields, each including a first and last pointer, the first pointer initialized to the first one of the plurality of task identification entries in the task identification queue, the last pointer initialized to the last one of the plurality of tack identification entries in the task identification queue;
(d) initializing a next task assignment pointer to the first one of the task identification entries in the task identification queue; and
(e) assigning the forward pointer field of the last one of the plurality of task identification entries in the task identification queue to identify the header.

35. The method as defined in claim 34 wherein the step of dispatching one a task of a series of tasks further comprises the steps of:
(i) identifying the one of the series of tasks to be dispatched by the task dispatcher by referring to a next task assignment pointer,
(ii) storing a reference in a task assignment list to the task identification entry representative of the task dispatched to one of a plurality of digital data processors, the task assignment list containing a plurality of entries, each entry being associated with one of said plurality of digital data processors, the reference in the task assignment list comprising a second pointer identifying the task identification entries of the task dispatched in the entry associated with one of the plurality of digital data processors to which the task is dispatched, and
(iii) on dispatching the task, advancing the next task assignment pointer to the task identified by the forward pointer field of the task dispatched.

36. The method as defined in claim 35 wherein the step of reorganizing the pre-selected order further comprises the step of using the second pointer in the task assignment list associated with the processor which finished processing a first one of the preselected number of last completed tasks to complete processing to identify the task assignment entries to be moved to the beginning of the ordered task assignment queue.

37. The method as defined in claim 34 wherein the step of determining if each one of the tasks in the series of tasks has been dispatched further comprises the step of examining if the next task assignment pointer identifies the header.

38. The method as defined in claim 33 wherein each digital data processor has an associated processor busy flag that indicates whether the associated digital data processor is processing a task and wherein prior to step (a), the method further comprises the step of clearing all the processor busy flags.

39. The method as defined in claim 38 wherein the step of dispatching one task of a series of tasks further comprises the steps of:
  (i) determining if any one of the plurality of digital data processors is not processing a task by examining that processor's associated processor busy flag, and
  (ii) setting the processor busy flag associated with the digital data processor when the task dispatcher dispatches a task thereto.

40. The method as defined in claim 38 wherein after step (b), the method further comprises the step of clearing the processor busy flag associated with each digital data processor that has completed processing the one task of the series of tasks dispatched thereto.

41. The method as defined in claim 40 wherein step (d) further comprises the step of determining that the processor busy flags are clear.

42. The method as defined in claim 34 wherein prior to step (a), the method further comprises the step of
  loading an unprocessed task counter with an initial value representative of the number of tasks identification entries in the ordered task identification queue
  adjusting the unprocessed task counter.

43. The method as defined in claim 42 wherein the step of dispatching one task of a series of tasks further comprises the step of adjusting the unprocessed task counter.

44. The method of claim 34 wherein the step of dispatching one task of a series of tasks further comprises the step of utilizing the order of the plurality of task identification entries in the task identification queue as the pre-selected order.

45. The method of claim 34 wherein the step of reorganizing further comprises the step of changing the order of the plurality of task identification entries in the task identification queue.

46. A digital data processing system comprising:
  A. a plurality of digital data processors for processing a plurality of task information;
  B. a queue for storing the task information in an order; and
  C. a task dispatcher for sequentially dispatching the task information to said plurality of digital data processors in the order that the task information is arranged in said queue, comprising
  means for storing task information in the queue;
  means for receiving task information from said plurality of digital data processors;
  means for placing task information at the beginning of the queue;
  means for detecting a last one of the task information to be processed; and
  means for reordering the task information in said queue after all task information has been processed so that a last one of the task information to be processed is placed at the beginning of said queue.

47. The digital data processing system as defined in claim 46 further comprising a task assignment list, including a plurality of entries, each entry being associated with one of said plurality of digital data processors, wherein the task dispatcher, upon dispatching a portion of the task information to one of said plurality of digital data processors, stores a reference to the portion of the task information in one of the plurality of entries in said task assignment list associated with said one of the plurality of digital data processors processing the dispatched portion of the task information.

48. The digital data processing system as defined in claim 47 wherein each digital data processor further comprises means for notifying said task dispatcher when said digital data processor completes processing task information dispatched thereto, and wherein said task dispatcher sequentially dispatches the task information when notified by said digital data processor.

49. The digital data processing system as defined in claim 48 wherein said task dispatcher further comprises means for identifying the portion of task information in said queue to be moved to the beginning of said queue by using an associated entry in said task assignment list relating to a last one of the plurality of digital data processors to complete processing.

50. The digital data processing system as defined in claim 49 wherein the task dispatcher further comprises means for determining when the task information has been dispatched.

51. The digital data processing system as defined in claim 50 wherein the task dispatcher further comprises means for determining when all task information in said queue has been processed.

* * * * *